United States Patent Office 3,138,556
Patented June 23, 1964

3,138,556
COATING REMOVER COMPOSITION
Henry A. Goldsmith, Torrance, and Robert B. Roessler, Rolling Hills Estates, Calif., assignors to Purex Corporation, Ltd., South Gate, Calif., a corporation of California
No Drawing. Filed Sept. 5, 1961, Ser. No. 135,726
15 Claims. (Cl. 252—136)

This invention relates to compositions useful in the removal or stripping of paints or coatings, and is especially directed to a composition particularly effective in the removal of chemically resistant coatings and paints such as those based on epoxy resins.

During recent years, very adherent, durable paints and coatings based upon chemically resistant resins have been developed, owing to the superior properties of these paints or coating compositions over the conventional lacquers and paints. However, because of the tenacity and durability of certain coatings based on such resins, and particularly on certain epoxy resins cured by incorporation of amine catalysts, there has been a problem of developing means for removing or stripping such obdurate coatings and paints rapidly and effectively from surfaces to which they have been applied, for example, from defectively coated parts or parts which it is desired to repaint. Although strippers have been developed for this purpose, they have not proven entirely satisfactory from the standpoint of rapid removal of certain of these coatings and freedom from adversely affecting or damaging the substrate, particularly where the substrate is aluminum, magnesium or steel. Many prior art compositions require several hours or more for complete stripping of chemically resistant coatings, while others requiring a shorter period for this purpose are too corrosive to the substrate, especially where the latter is magnesium, aluminum, or steel.

It is an object of this invention to provide novel coating or paint stripping compositions having superior effectiveness for removing obdurate coating compositions such as those based upon epoxy resins.

Another object of this invention is the provision of novel paint and coating strippers effective for removing chemically resistant paints or coatings within a relatively short period, for example, in less than 3 hours, and preferably less than about 2 hours.

Still another object is the provision of novel paint and coating strippers effective for removing obdurate paint or coatings rapidly, and which during their period of application are substantially non-corrosive to the substrate, particularly aluminum, magnesium or steel.

Yet another object is the design of non-flammable stripping compositions having the aforementioned characteristics.

A still further object is to afford paint strippers of the nature noted above, which have good stability and which can be applied either by immersion of the part in the composition, or by spray, brush or similar application to the coated surface of the part.

Still another object is the provision of procedure for removal of obdurate paints and coatings such as those based on epoxy resins, employing the aforementioned types of stripping compositions.

Other objects and advantages of the invention will appear hereinafter.

In application Serial Number 135,727 of Arden and Roessler, filed of even date herewith, it is disclosed that when hypophosphorous acid ($H_3PO_2$) is incorporated into stripping compositions containing a substantial proportion of chlorinated hydrocarbon solvent, preferably methylene chloride, and preferably also containing water and a lower alcohol, the effectiveness of the composition for removing paint and coatings based on epoxy resins, is materially improved over prior art compositions containing in place of hypophosphorous acid, other activators such as ammonia, amines, organic acids, e.g., aliphatic acids, and phenols.

It has now been found that the epoxy stripping effectiveness of the hypophosphorous acid is materially further enhanced by incorporating, together with the hypophosphorous acid, an organic activator compound for hypophosphorous acid, preferably certain classes of organic activators, namely, alkyl phosphites, and hydroxylated six membered aromatic and oxygen heterocyclic compounds. Although the latter compounds are preferred over the alkyl phosphites, we have found that the alkyl phosphites function in substantially the same manner as the other organic compounds mentioned, all acting as activators for hyphosphorous acid.

Thus, employing hypophosphorous acid and such organic activators in stripping compositions according to the invention, coating systems of the most tenacious and durable nature, such as those composed of amine catalyzed epoxy resins can be stripped from the adjacent substrate in a substantially reduced period of less than 3 hours, often in less than 1½ hours, as compared to conventional strippers for this purpose, which even if they strip at all, may require, for example, 10 hours or more for stripping such coatings.

It is believed that the stripper containing chlorinated hydrocarbon, e.g., methylene chloride, functions in the nature of a penetrating and swelling agent which causes the coating to swell or expand and thus detach itself from the surface to which it is applied, and that the hypophosphorous acid and its coactivators have an efficient activating effect on this penetrating and softening action by which they assist the chlorinated hydrocarbon to pass through the coating. The hypophosphorous acid and its coactivator particularly appear to have a bond releasing function which aids in breaking the bond holding the coating to the substrate. As a result of the combined effect of the chlorinated hydrocarbon, the hypophosphorous acid, and its coactivator, the expanded softened coating can be stripped or rinsed from the surface of the part in a minimum period of time. The superior action of hypophosphorous acid in paint stripping compositions of the character described herein, over other acids tested, including the related phosphoric and phosphorous acids, indicates that such superior effectiveness may be related to the reducing action of hypophosphorous acid, in addition to that of its acidity. However, the invention is not to be taken as limited by any theory of the function of the hypophosphorous acid and its coactivators in the paint stripping compositions of the invention.

Representative of alkyl phosphites which can be employed as organic activators in combination with hypophosphorous acid, we can employ dialkyl hydrogen phosphites and trialkyl phosphites containing lower alkyl groups, and in which each alkyl chain can contain, for example, from 1 to about 8 carbon atoms. Examples of such alkyl phosphites are dimethyl, diethyl, dipropyl, dibutyl, and di-2-ethylhexyl hydrogen phosphite, and trimethyl, triethyl, tripropyl, triisopropyl, tributyl, trihexyl, tri-2-ethylhexyl and tricresyl phosphite.

The preferred six membered hydroxylated aromatic and heterocyclic activators of the invention, employed in combination with the hypophosphorous acid, have the following general formula:

 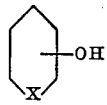

where X is a member of the group consisting of $\equiv$C—OH,

≡C—OCH₃, ≡—COOH and —O— radicals, and derivatives thereof. Examples of such compounds are p-methoxy phenol (p-hydroxy anisole), marketed technically pure as Ansul HA, salicylic acid, hydroquinone, resorcinol, kojic acid, and the like. These compounds have the following structural formulae:

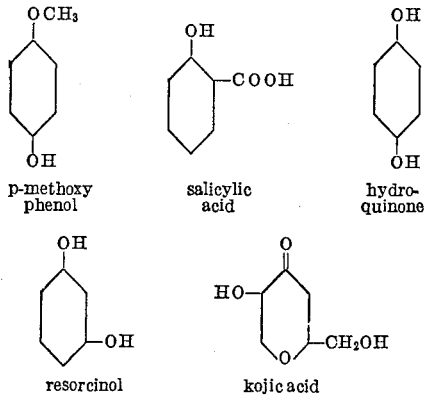

Of the above compounds, p-methoxy phenol, kojic acid and salicylic acid have been found to produce best results, in decreasing order of effectiveness, p-methoxy phenol having been found to be most effective.

It has been found that the above alkyl phosphites and aromatic and heterocyclic activators function, together with the hypophosphorous acid, in a synergistic manner to enhance materially the paint removing characteristics resulting from the use of the hypophosphorous acid. Thus, said activators when employed alone, that is, in the absence of hypophosphorous acid, are substantially of no greater effectiveness than many other compounds, such as phenols, previously employed as activators, and may require, for example, in excess of five hours for stripping. On the other hand, the effectiveness of hypophosphorous acid, that is, its ability to remove certain resistant coatings such as epoxy coatings, in a period of the order of about 3 hours when employed in a stripper composition including a chlorinated hydrocarbon, can be markedly improved by incorporating therewith an organic activator as described above, so that, for example, the stripping time for removing the same type of coating can thus be reduced to as little as one and a half hours or less. Also, by employing such organic activators in combination with hypophosphorous acid in such paint stripping compositions, the amount of hypophosphorous acid employed can be reduced substantially, to obtain stripping in the same period of time as when employing a stripper containing a much larger amount of hypophosphorous acid and in the absence of the above organic activator.

An additional important advantage of the use of the above organic activators in combination with the hypophosphorous acid is, that in addition to increasing the rapidity of stripping of the resistant coating, they tend to decrease the corrosiveness of the composition on magnesium, aluminum and steel parts to which the coatings are applied.

The amount of hypophosphorous acid which can be employed can vary in the range of about 0.25 to about 15% by weight of the composition, and preferably is in the range of about 1 to about 10%, an optimum quantity being about 4% by weight. Amounts larger than about 10% by weight are not favored, since this increases corrosive effects on magnesium and aluminum parts and decreases stability of the composition. Use of insufficient hypophosphorous acid does not effectively aid in decreasing stripping time. Hypophosphorous acid is preferably employed in the form of the commercially available 50% aqueous solution, although aqueous solutions of other concentrations can be employed.

The amount of organic activator described above may be employed in the range from about 0.25 to about 10% by weight of the composition, and usually from about 0.25 to about 3% by weight, with from about ½ to 2% being optimum, particularly in the case of the alkyl phosphites, p-hydroxy anisole, and kojic acid. Where salicylic acid is employed the proportions used range preferably from about 1 to about 6% by weight.

The chlorinated organic solvent used in our composition is exemplified by methylene chloride, ethylene dichloride, trichloroethylene, methyl chloroform, propylene dichloride, perchloroethylene, 1, 2, 4 trichlorobenzene and orthodichlorobenzene. All of these chlorinated materials are liquids throughout the entire range of operating temperatures normally employed with the compositions of the invention. The choice of the particular chlorinated organic solvent used is influenced by the operating temperature for which a particular coating stripping composition is formulated. Thus, the low boiling chlorinated aliphatic hydrocarbons noted above are preferably employed in compositions which are designed to be used at or near room temperatures, while chlorinated benzene derivatives, such as orthodichlorobenzene, are primarily suitable for use in compositions which are designed to be used at elevated temperatures. In general, the quantity of the chlorinated organic solvent is varied to accommodate other ingredients, but will normally be present in amounts generally in the range of about 40 to about 80%, preferably about 50 to about 70% by weight of the total composition.

Because of the corrosive nature of hypophosphorous acid on metals such as aluminum, magnesium and steel, it is generally preferred to incorporate suitable amounts of corrosion inhibitors into the composition. The inhibitors so employed should be of a nature which produce maximum corrosion inhibiting effect on the metal part from which the coating is being stripped, without adversely affecting the function of the hypophosphorous acid, and/or the organic activator; in other words, substantially without decreasing the rate of coating removal. We have found that a number of corrosion inhibitors give good inhibition while permitting rapid stripping. These include among others, for example, the ampholytic surface active compounds (1) oleyl ethyl cycloimidinium 1-hydroxy, 3-ethyl sodium alcoholate, 2-methyl sodium carboxylate (marketed as Miranol OM–SF), (2) N-alkyl amino sodium propionate, the alkyl group containing from 12 to 14 carbon atoms (marketed as Deriphat 151), and oleyl sarcosine (marketed as Sarkosyl O). By proper use of inhibitors such as those noted above, the attack of the coating stripper of the invention upon metals such as magnesium, aluminum and steel, and their alloys, can be materially reduced with little, if any, adverse effect on the stripping effectiveness of the composition. Generally, about 0.1 to about 2%, preferably about 0.3 to about 1.5% of the inhibitor or combination of inhibitors are employed based on the weight of the composition.

The presence of minor amounts of water in the epoxy stripping composition of the invention is of importance in reducing the stripping time. Thus an amount of water for this purpose in the range of about 0.25 to as high as about 15% and preferably from about 0.25 to about 5%, is utilized. If an amount of water greater than about 15% is employed, this tends to increase stripping time. The water employed in the composition may be introduced as such or may be introduced together with one or more of the other components of the composition. For example, it is convenient to employ a commercially available 50% aqueous hypophosphorous acid solution, the use of this latter material introducing all or part of the required amount of water into the composition.

In order to improve the compatibility of the water with the chlorinated hydrocarbon, e.g., methylene chloride, employed in the composition, it has been found useful to use a coupling agent. The coupling agent functions as a mutual solvent for the water and the chlorinated hydrocarbon such as methylene chloride. Examples of coupling agents which can be employed include lower aliphatic alcohols such as methanol, ethanol and isopropanol, and their glycol ethers, such as the methyl, ethyl or butyl ethers of ethylene, diethylene or propylene glycol, the preferred material being methanol. The amount of such coupling agent employed may range from about 3 to about 20%, preferably about 5 to about 15% by weight of the composition. It has been found that in the absence of such coupling agent the aqueous phase is not rendered fully active in the chlorinated hydrocarbon and the results are not as effective as when employing such coupling agent.

Various surface active agents which are substantially stable to hypophosphorous acid or to any of the other ingredients of the composition including the organic activators, are also desirably employed in the compositions according to the invention. A surface active agent found particularly suitable is marketed as Petronate HL. The latter material is a petroleum sulfonate composition composed of about 62% petroleum sulfonate, believed to be of the approximate composition $C_{26}H_{42}SO_3Na$, and an average molecular weight of 457, 33% mineral oil, and 5% water.

It has been found that this surface active agent imparts satisfactory water rinsability, penetration, and shelf stability to the composition, and aids in inhibiting corrosion, particularly on aluminum and magnesium alloys. However, other acid-stable surface active agents can be employed, an example of another such wetting agent being Nacconol Z which is an 85% alkyl benzene sulfonate having an average of 12 carbon atoms in the alkyl chain. Alkyl aryl sulfonates having, for example, 9 to 15 carbon atoms in the alkyl chain can be employed. The amount of surface active agent which can be employed can vary in the range from about 2 to about 10% by weight of the composition.

Also preferably, but not necessarily, employed in the invention composition are evaporation retardants. The function of these materials is to maintain the composition unchanged after it has been sprayed or poured on a coating, by holding evaporation of the essential ingredients to a minimum during the period of stripping the coating. Generally, waxes, for example, paraffin wax and microcrystalline wax, are employed for this purpose. The action of such waxes is assisted by the incorporation of small amounts of high molecular weight alcohols such as ethylhexanol and pine oil, as well as high molecular weight glycols such as hexylene glycol. The amount of wax or other evaporation retardant aid which can be employed may vary from about 0.1 to about 3% by weight of the composition.

Where the stripper of the invention is to be applied to obdurate coatings on inclined or vertical surfaces it is usually advantageous to incorporate in the composition a thickening agent to confer thixotropic properties to the composition. Minor amounts of suitable thickeners confer upon the composition a sufficient viscosity such that in the range of about 200 to about 800 centipoises. A preferred material for this purpose is methyl cellulose, e.g., the brand marketed as Methocel. However, other suitable materials may be employed for this purpose. The amount of thickening agent generally employed may range from about 0.5 to about 3% by weight of the composition.

The following example shows a comparison of the effectiveness for stripping a highly tenacious durable type of epoxy coating, as between compositions containing acids other than hypophosphorous acid, compositions containing hypophosphorous acid in the absence of an organic activator, and compositions containing both hypophosphorous acid and an organic activator, according to the invention.

EXAMPLE 1

Each of the compositions below was tested for stripping effectiveness on a sample of 2024 aluminum alloy having a chromate type conversion coating formed thereon, to which was first applied a 1 mil primer coat containing an amine catalyzed epoxy resin, and over which was applied a 2.5 mil blue top coat based on amine catalyzed epoxy resin. Some of the panels were baked at 200° F. for about 1 hour. The unbaked panels so coated were treated with each of the Compositions 4 to 17 of Table I below, while the panels having the baked coatings thereon were treated with Compositions 18 to 21. Such treatment was carried out by applying the paint stripper to each panel, with the panel placed flat or at a 45° angle. Stripping was rated as complete when the blue epoxy paint coating had swelled and blistered and could be rinsed off with little or no wiping. The compositions and results are given in Table I below:

*Table I*

COMPOSITIONS—PERCENT BY WEIGHT

| | (4) | (5) | (6) | (7) | (8) | (9) | (10) | (11) | (12) | (13) | (14) | (15) | (16) | (17) | (18) | (19) | (20) | (21) |
|---|---|---|---|---|---|---|---|---|---|---|---|---|---|---|---|---|---|---|
| Methylene chloride | 75 | 73 | 76.5 | 67 | 74 | 75.5 | 72 | 75.5 | 77 | 77 | 75.5 | 72 | 72 | 72 | 67 | 70.5 | 71 | 71 |
| Methyl alcohol | 8 | 8 | 8 | 8 | 8 | 8 | 8 | 8 | 8 | 8 | 8 | 8 | 8 | 8 | 12 | 12 | 12 | 12 |
| Paraffin wax | 2 | 2 | 2 | 2 | 2 | 2 | 2 | 2 | 2 | 2 | 2 | 2 | 2 | 2 | 2 | 2 | 2 | 2 |
| Methocel | 1 | 1 | 1 | 1 | 1 | 1 | 1 | 1 | 1 | 1 | 1 | 1 | 1 | 1 | 1.5 | 1.5 | 1.5 | 1.5 |
| Mycrocrystalline wax | | | | | | | | | | | | | | | 0.1 | 0.1 | | |
| Sarcosyl O | | | | | | | | | | | | | | | | 0.5 | | |
| 2-ethyl hexanol | | | | | | | | | | | | | | | 4 | | | |
| Hypophosphorous acid (50% aqueous solution) | | | | 18 | 8 | 8 | 5 | 8 | 5 | 5 | 8 | 8 | 8 | 8 | 8 | 8 | 8 | 8 |
| Formic acid (90% aqueous solution) | 10 | | | | | | | | | | | | | | | | | |
| Glycolic acid (70% aqueous solution) | | 10 | 8 | | | | | | | | | | | | | | | |
| Nacconol Z | 4 | 6 | 6 | | | | 4 | | 4 | 4 | | | | | | | | |
| Petronate HL | | | | 4 | 4 | 4 | | 4 | | | 4 | 4 | 4 | 4 | 4 | 4 | 4 | 4 |
| p-Methoxy phenol | | | | | | 1.5 | 5 | 0.75 | | | | | | | | | | |
| Kojic acid | | | 1.5 | | 3 | | | 0.75 | | | | | | | 1.5 | 1.5 | | |
| Salicylic acid | | | | | | | | | 3 | | | | | | | | | |
| Resorcinol | | | | | | | | | | 3 | | | | | | | | |
| Triisopropyl phosphite | | | | | | | | | | | 1.5 | | | | | | | |
| Tricresyl phosphite | | | | | | | | | | | | 5 | | | | | | |
| Dibutyl hydrogen phosphite | | | | | | | | | | | | | 5 | | | | | |
| Dimethyl hydrogen phosphite | | | | | | | | | | | | | | 5 | | | | |
| Trimethyl phosphite | | | | | | | | | | | | | | | | | 1.5 | |
| Tributyl phosphite | | | | | | | | | | | | | | | | | | 1.5 |
| Time in hours required for complete stripping | (¹) | >17 | >5 | 3.5 | 1.5 | 1.5 | ²35 | 1¾ | 1.5 | 2 | 2.5 | 2.5 | 2.5 | 2.5 | 1.25 | 1.5 | 2 | 2 |

¹ No effect.
² Min.

It is seen from Table I above that compositions 4, 5 and 6, containing no hypophosphorous acid, were ineffective to cause stripping of the epoxy coating except after many hours of treatment. It is particularly noteworthy that this was true for Composition 6, which although it contained kojic acid, one of the organic activators of the invention, did not contain the other essential component, hypophosphorous acid. Composition 7 containing hypophosphorous acid, but in the absence of the above described organic activator, stripped these obdurate amine catalyzed epoxy coatings in a period of 3.5 hours.

However, Compositions 8, 9, 10, 11, 18 and 19, containing the combination of hypophosphorous acid and the preferred organic activators p-methoxy phenol or kojic acid, singly, or in combination as in Composition 11, resulted in complete stripping of these tough epoxy coatings in a period of from under 1 hour—Composition 10, to about 1.5 hours. Compositions containing hypophosphorous acid and either salicylic acid or resorcinol—Compositions 12 and 13, required from about 1.5 to about 2 hours to accomplish stripping.

Stripping compositions according to the invention, containing hypophosphorous acid and alkyl phosphite as the organic activator, were also superior in their stripping effectiveness to hypophosphorous acid alone, but not as stable on storage as the preferred compositions containing hypophosphorous acid and, for example, p-methoxy phenol or kojic acid as activators. Freshly made Compositions 14, 15, 16, 17, 20 and 21, representative of this class of invention compositions, required about 2 to 2.5 hours to accomplish stripping.

The following example shows the corrosion inhibiting effectiveness on Dow 7 magnesium, 2024 aluminum and 1020 steel, of certain inhibitors when employed in the invention composition containing hypophosphorous acid and certain of the organic activators described above, for stripping an epoxy coating from the surface of such metals.

EXAMPLE 2

Into each of the compositions listed in Table II below was placed one each of three test panels of Dow 7 magnesium, 2024 aluminum and 1020 steel, respectively, each panel having four square inches of surface area. Each panel was immersed for a period of 24 hours in the respective compositions, which were maintained at room temperature. Corrosion, expressed as the loss or gain in weight, in milligrams, of each of the panels was observed at the end of the 24 hour period. Independently, the time was observed for stripping of baked epoxy coatings from 2024 aluminum primed with chromate conversion coating as in Example 1. The compositions and results are given in Table II below. It is noted that the weight change of each specimen due to corrosion is given in terms of a loss or gain in weight. The weight change is given as a loss (negative) where metal was actually removed, and the weight change is given as a gain (positive) where the effect of corrosion was to form a coating and thus adding weight to the specimen.

*Table II*

| Formulation (Remainder of each formulation is methylene chloride)—percent by weight | | | | | Inhibitor | Corrosion—Loss or gain per 4 square inch panel in 24 hours | | | |
|---|---|---|---|---|---|---|---|---|---|
| $H_3PO_2$ 50% Aq. Sol. | $CH_3OH$ | 2-ethyl hexanol | Petronate HL | Activator | | Epoxy strip time (min.) | Dow 7 Mg | 2024 Al | 1020 steel |
| 8 | 12 | | 4 | 1.5% kojic acid | | 120 | −129.7 | 80.8 | 5.4 |
| 8 | 12 | | 4 | ....do.... | 0.5% Deriphat 151 | 135 | 15 | 76.1 | −1.2 |
| 8 | 12 | | 4 | ....do.... | 0.5% Sarkosyl O | 90 | −3.3 | 36.3 | −1.8 |
| 8 | 12 | | 4 | 1.5% p-hydroxy-anisole (=HA). | | 150 | 154.34 | 513.7 | 11.9 |
| 8 | 12 | | 4 | 1.5% HA | 0.5% Deriphat 151 | 90 | 40.1 | 74.9 | 0.8 |
| 8 | 8 | 4 | 4 | 1.5% HA | ....do.... | 115 | 41.6 | −40.1 | −6.6 |
| 8 | 8 | 4 | 4 | 1.5% HA | 0.5% Sarkosyl O | 60–80 | −39.6 | 104.8 | −7.1 |
| 8 | 8 | 4 | 4 | 1.5% HA | 1% Miranol OM-SF | 130 | 6.9 | −120.8 | |
| 8 | 12 | | 4 | 1.5% Tricresyl phosphite (=TCP). | | 80–135 | −94.7 | 117.8 | 7.5 |
| 8 | 8 | 4 | 4 | 1.5% TCP | 0.5% Deriphat 151 | 110 | −51.4 | 52.3 | −6.2 |

From Table II above, it is seen that in formulations employing kojic acid as organic activator, the incorporation of Sarkosyl O into the composition as inhibitor substantially reduced corrosion on all three types of metal panels as compared to the control not including the inhibitor, while the incorporation of Deriphat 151 was effective on Dow 7 magnesium and 1020 steel, and such inhibitors did not unfavorably affect stripping time. Sarkosyl O is noted as particularly effective on Dow 7 magnesium.

As to formulations containing p-hydroxy anisole, each of the four inhibitors tested therewith decreased corrosion on all three types of panels.

With respect to formulations containing tricresyl phosphite as organic activator, the use of Deriphat 151 as inhibitor was effective in decreasing corrosion on all three types of panels, and did not adversely affect stripping time to any material extent.

Hence it is seen that each individual inhibitor has a somewhat different effect when incorporated in the various invention compositions, depending on the type of organic activator employed and the particular base metal of the substrate on which the epoxy coating is applied.

EXAMPLE 3

The following are examples of particularly effective stripping compositions which have been found to strip the most durable type of epoxy coatings in a period of about 1.5 hours or less, from magnesium, aluminum and steel substrates, with minimum corrosion of the metal, Composition A being an immersion type stripper and Composition B a thixotropic epoxy stripper.

*Composition A*

|  | Percent by weight |
|---|---|
| Hypophosphorus acid (50% aqueous solution) | 8.0 |
| Methyl alcohol | 12.0 |
| P-hydroxy anisole | 1.5 |
| Corosion inhibitor | 0.5 |
| Petronate HL (petroleum sulfonate composition) | 4.0 |
| Methylene chloride | 74.0 |
|  | 100.0 |

Composition B

| | Percent by weight |
|---|---|
| Paraffin wax | 2.0 |
| Microcrystalline wax | 0.10 |
| Methylene chloride | 70.15 |
| Methocel | 1.75 |
| Petronate HL | 4.0 |
| Corrosion inhibitor | 0.50 |
| Hypophosphorous acid (50% aqueous solution) | 8.0 |
| P-hydroxy anisole | 1.50 |
| Methyl alcohol | 10.0 |
| 2-ethyl hexanol | 2.0 |
| | 100.0 |

The corrosion inhibitor in Compositions A and B above can be, for example, Miranol OM–SF, Deriphat 151 or Sarkosyl O, described above. However, other suitable corrosion inhibitors can also be used.

The presence of inhibitors such as those mentioned specifically above produce low values of corrosion on aluminum and magnesium, and the use of p-hydroxy anisole as activator together with hypophosphorous acid, results in greatly reduced stripping time according to the invention. The stripping Compositions A and B above are also stable over relatively long periods, for example 2 to 4 months or longer, so that they can be stored in suitable containers for such periods substantially without loss of effectiveness.

Although the invention has been described primarily in relation to the stripping of epoxy coatings, the invention compositions can also be used for removal of other types of coating systems such as phenolics and amine-aldehyde condensation products, for example.

From the foregoing, it is seen that the invention provides a novel composition and process for stripping obdurate coatings, particularly those which have heretofore been the most difficult types to remove, such as epoxy coatings, in a substantially shorter period of time as compared to conventional formulations for this purpose, and such compositions can be designed to cause relatively minor corrosion of the substrate during the stripping period, particularly where aluminum or magnesium is used for this purpose.

While we have described particular embodiments of our invention for the purpose of illustration, it should be understood that various modifications and adaptations thereof may be made within the spirit of the invention as set forth in the appended claims.

We claim:

1. A coating remover composition consisting essentially of about 40 to about 80% by weight of methylene chloride, about 0.25 to about 15% by weight of hypophosphorous acid, and about 0.25 to about 10% by weight of an alkyl phosphite containing from 2 to 3 alkyl chains, each such alkyl chain containing from 1 to about 8 carbon atoms.

2. A coating remover composition consisting essentially of about 40 to about 80% by weight of a chlorinated hydrocarbon liquid solvent, about 0.25 to about 15% by weight of hypophosphorous acid, and about 0.25 to about 10% by weight of an organic compound having the general formula

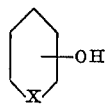

where X is a member of the group consisting of ≡C—OH, ≡C—OCH$_3$, ≡C—COOH and —O— radicals.

3. A coating remover composition consisting essentially of about 40 to about 80% by weight of a chlorinated hydrocarbon liquid solvent, about 0.25 to about 15% by weight of hypophosphorous acid, and about 0.25 to about 10% by weight of an organic compound of the group consisting of p-hydroxy anisole, salicylic acid, hydroquinone, resorcinol and kojic acid.

4. A coating remover composition consisting essentially of about 40 to about 80% by weight of a chlorinated hydrocarbon liquid solvent, about 0.25 to about 15% by weight of hypophosphorous acid and about 0.25 to about 10% by weight of p-hydroxy anisole.

5. A coating remover composition consisting essentially of about 40 to about 80% by weight of a chlorinated hydrocarbon liquid solvent, about 0.25 to about 15% by weight of hypophosphorous acid, and about 0.25 to about 10% by weight of kojic acid.

6. A coating remover composition consisting essentially of about 40 to about 80% by weight of a chlorinated hydrocarbon liquid solvent, about 0.25 to about 15% by weight of hypophosphorous acid, and about 0.25 to about 10% by weight of salicylic acid.

7. A coating remover composition particularly adapted for removal of coatings based on epoxy resins, consisting essentially of about 40 to about 80% by weight of a chlorinated hydrocarbon liquid solvent, about 0.25 to about 15% by weight of hypophosphorous acid, about 0.25 to about 10% by weight of an organic compound of the group consisting of p-hydroxy anisole, salicylic acid, hydroquinone, resorcinol and kojic acid, about 0.25 to about 15% by weight of water, and about 3 to about 20% by weight of a coupling agent selected from the group consisting of the lower aliphatic alcohols and their glycol ethers.

8. A coating remover composition consisting essentially of about 40 to about 80% by weight of a chlorinated hydrocarbon liquid solvent, about 0.25 to about 15% by weight of hypophosphorous acid, about 0.25 to about 10% by weight of an organic compound of the group consisting of p-hydroxy anisole, salcylic acid, hydroquinone, resorcinol and kojic acid, 0.25 to about 15% by weight of water, about 3 to about 20% by weight of a coupling agent selected from the group consisting cf the lower aliphatic alcohols and their glycol ethers, and about 0.1 to about 2% by weight of an organic corrosion inhibitor.

9. A coating remover composition consisting essentially of about 40 to about 80% by weight of a chlorinated hydrocarbon liquid solvent, about 0.25 to about 15% by weight of hypophosphorous acid, about 0.25 to about 10% by weight of an organic compound of the group consisting of p-hydroxy anisole, salicylic acid, hydroquinone, resorcinol and kojic acid, about 0.25 to about 15% by weight of water, about 3 to about 20% by weight of a coupling agent selected from the group consisting of the lower aliphatic alcohols and their glycol ethers, about 0.1 to about 2% by weight of an organic corrosion inhibitor selected from the group consisting of oleyl ethyl cycloimidinium 1-hydroxy, 3-ethyl sodium alcoholate, 2-methyl sodium carboxylate; N-alkyl amino sodium propionate, the alkyl group containing from 12 to 14 carbon atoms; and oleyl sarcosine, about 2 to about 10% by weight of a surface active agent of the group consisting of petroleum sulfonates and alkyl aryl sulfonates, and about 0.1 to about 3% by weight of a wax selected from the group consisting of paraffin wax and microcrystalline wax as an evaporation retardant.

10. A coating remover composition consisting essentially of about 40 to about 80% by weight of a chlorinated hydrocarbon liquid solvent, about 0.25 to about 15% by weight of hypophosphorous acid, about 0.25 to about 10% by weight of p-hydroxy anisole, about 0.25 to about 15% by weight of water, about 3 to about 20% of a coupling agent of the group consisting of the lower aliphatic alcohols and their glycol ethers, about 0.1 to about 2% by weight of an organic corrosion inhibitor selected from the group consisting of oleyl ethyl cycloimidinium 1-hydroxy, 3-ethyl sodium alcoholate, 2-methyl sodium carboxylate; N-alkyl amino sodium propionate, the alkyl group containing from 12 to 14 carbon atoms; and oleyl sarcosine, and about 2 to about 10% by weight of a surface active agent of the group consisting of petroleum sulfonates and alkyl aryl sulfonates.

11. A coating remover composition particularly adapted for removal of coatings based on epoxy resins, consisting essentially of about 40 to about 80% by weight of methylene chloride, about 0.25 to about 15% by weight of hypophosphorous acid, about 0.25 to about 10% by weight of p-hydroxy anisole, about 0.25 to about 15% by weight of water, and about 3 to about 20% by weight of methanol.

12. A coating remover composition particularly adapted for removal of coatings based on epoxy resins, consisting essentially of about 50 to about 70% by weight of methylene chloride, about 0.1 to about 10% by weight of hypophosphorous acid, about 0.25 to about 3% by weight of p-hydroxy anisole, about 0.25 to about 5% by weight of water, about 5 to about 15% by weight of methanol, about 0.1 to about 2% of an organic corrosion inhibitor selected from the group consisting of oleyl ethyl cycloimidinium 1-hydroxy, 3-ethyl sodium alcoholate, 2-methyl sodium carboxylate; N-alkyl amino sodium propionate, the alkyl group containing from 12 to 14 carbon atoms; and oleyl sarcosine, about 2 to about 10% by weight of a surface active agent of the group consisting of petroleum sulfonates and alkyl aryl sulfonates, and about 0.1 to about 3% by weight of a wax selected from the group consisting of paraffin wax and microcrystalline wax as an evaporation retardant.

13. A coating remover composition consisting essentially of about 40 to about 80% by weight of a chlorinated hydrocarbon liquid solvent, about 0.25 to about 15% by weight of hypophosphorous acid, about 0.25 to about 10% by weight of an organic activator for hypophosphorous acid, selected from the group consisting of alkyl phosphites containing from 2 to 3 alkyl chains, each such alkyl chain containing from 1 to about 8 carbon atoms, and an organic compound of the group consisting of p-hydroxy anisole, salicylic acid, hydroquinone, resorcinol and kojic acid.

14. A coating remover composition consisting essentially of about 50 to about 70% by weight of a chlorinated hydrocarbon liquid solvent, about 1 to about 10% by weight of hypophosphorous acid, and about 0.25 to about 3% by weight of an organic activator for hypophosphorous acid, selected from the group consisting of alkyl phosphites containing from 2 to 3 alkyl chains, each such alkyl chain containing from 1 to about 8 carbon atoms, and an organic compound of the group consisting of p-hydroxy anisole, salicylic acid, hydroquinone, resorcinol and kojic acid.

15. A coating remover composition as defined in claim 13, said chlorinated hydrocarbon liquid solvent being methylene chloride.

References Cited in the file of this patent
UNITED STATES PATENTS

| | | |
|---|---|---|
| 2,507,985 | Kuentzel | May 16, 1950 |
| 2,528,378 | Mannheimer | Oct. 31, 1950 |
| 2,852,471 | Atkins et al. | Sept. 16, 1958 |

OTHER REFERENCES

Lesser, "Paint Remover," Sanitary Chemicals, pages 133–136 and 161, February 1953.

McCutcheon, "Surfactants Listed," Soap and Chemical Specialties, 4th revision (page 50, January 1958, and page 65, March 1958).

"The Condensed Chemical Dictionary," 5th ed. (1956), pages 574, 581, 942 and 958, Reinhold Publishing Co.

"The Merck Index," 6th edition (1952), page 441.